Figure 1:
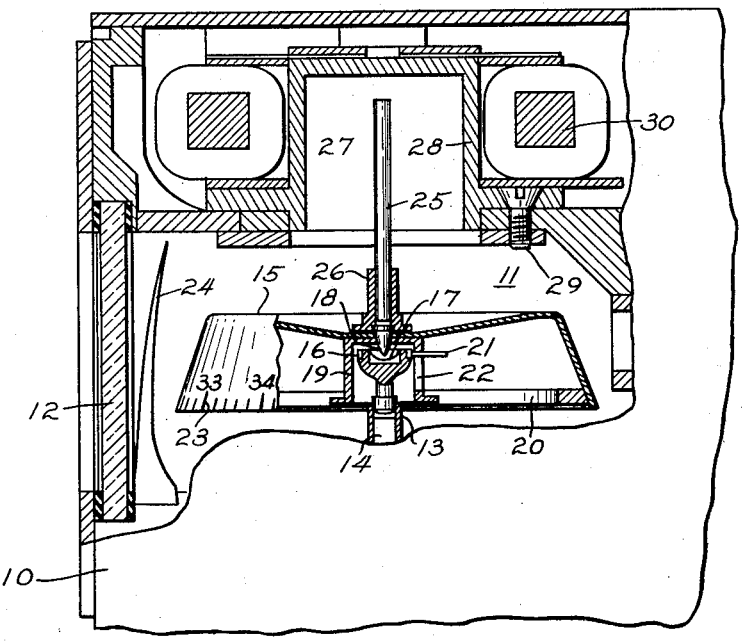

Jan. 13, 1959  J. F. DEMENT ET AL  2,867,915
INSTRUMENT TILT SIMULATOR FOR NON-FLYING AIRCRAFT TRAINER
Filed Nov. 3, 1953

INVENTOR
HOWARD H. J. BENSON, JR.
EDWARD H. NIEMEYER
JAMES F. DEMENT

BY Scrivener & Parker

ATTORNEYS

United States Patent Office 2,867,915
Patented Jan. 13, 1959

2,867,915
INSTRUMENT TILT SIMULATOR FOR NON-FLYING AIRCRAFT TRAINER

James F. Dement, Alexandria, Va., Howard H. J. Benson, Jr., Takoma Park, Md., and Edward H. Niemeyer, Edinburg, Va., assignors, by mesne assignments, to ACF Industries, Incorporated, a corporation of New Jersey Application November 3, 1953, Serial No. 389,988

5 Claims. (Cl. 35—12)

This invention relates to non-flying aircraft trainers and more particularly, to means for accurately simulating the self-leveling action of a gimbaled or pendulously-mounted object as the trainer undergoes simulated movement in pitch and roll in response to trainee manipulation of simulated flight controls.

Actual aircraft generally carry instruments or other devices whose correct operation is dependent upon their remaining substantially horizontal or level while their support is tilted due to changes in the aircraft position. One such device is a magnetic compass which may be gimbaled or otherwise pendulously mounted to remain substantially plumb, or level, with respect to the earth's surface, when its support is tipped in any direction due to the gyrations of the aircraft.

In non-flying aircraft trainers which do not tilt, maximum realism in performance of instruments of the above type can be realized only when they appear to remain level or substantially so as changes in the trainer's pitch or roll position is simulated through manipulation of simulated flight controls. A pendulously mounted device in aircraft is, of course, affected not only by the force of gravity but also by centrifugal force so that it frequently happens that when the aircraft is not in level flight it may none-the-less be turning at such a rate that a gimbaled device would not tilt so as to remain level with respect to the earth's surface, but would remain plumb with respect to the interior of the aircraft, which is, of course, actually tilted with respect to the earth's surface.

Variations in the rate of turn and accompanying degree of bank are productive of resultant forces which may act in an infinite number of directions dependent upon how nearly the two actions are coordinated. This, of course, results in a corresponding tilting of the instrument which in some instances may be precisely opposite from the direction of bank of the aircraft. For absolute realism in non-flying trainers, pendulously supported instruments or other devices must tilt in response to these simulated forces in precisely the same manner as the actual instruments do in aircraft and one of the principal objects of this invention is to provide a novel means by which these described effects may be realistically simulated.

Another object of the invention is to provide in non-flying aircraft trainers novel means for simulating the response of freely tiltable objects to simulated forces resulting from trainee actuation of flight controls with particular (though not exclusive) application of such means to a magnetic-compass simulator.

Figure 2:
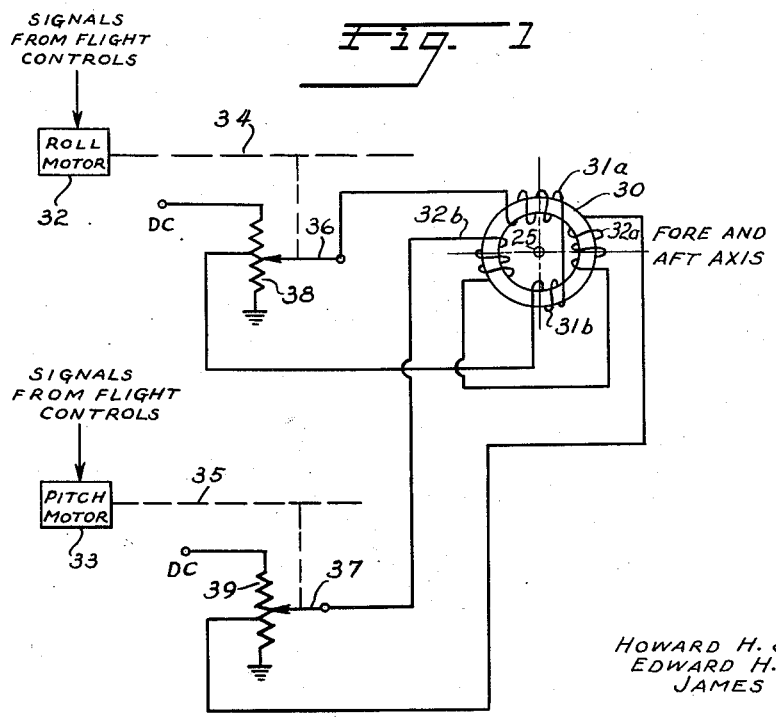

Other objects and their attendant advantage will become apparent as the following detailed description is read in conjunction with the accompanying drawings wherein:

Fig. 1 is a side view of a magnetic compass simulator, partly in elevation and partly in cross section, embodying the present invention; and Fig. 2 is a diagrammatic illustration of a tilting coil and associated electrical devices which may be utilized with a device similar to the compass of Fig. 1.

Referring now to Fig. 1 of the drawings there is illustrated a simulated magnetic compass of the type which, when utilized in actual aircraft, is known as a standby compass. The present invention is illustrated as applied to a simulated magnetic compass but it will be apparent to those skilled in the art that the invention may be incorporated in several different devices whose operation is dependent upon tilting or moving to various positions depending on the simulated position of the aircraft trainer in pitch or roll.

The simulated compass illustrated may include a casing 10 containing a chamber 11 closed at its forward end by a suitable lens 12 and filled with suitable damping liquid, such as clear alcohol. Supported centrally in the chamber 11 is an axially drilled standard 13 which is rotatable about a fixed vertical stub shaft 14 and which supports a compass card 15 suitably vertically mounted on said standard, as by holder 16 for a bearing 17 in which a pivot 18 is journaled. Pivot 18 provides a point support for compass card 15 which may be provided with a centrally disposed inverted cup-shaped member 19 and metallic ring 20 whose combined weights serve to lower the center of gravity of the compass card assemblage so that the same is pendulously supported on the point of pivot 18 thereby rendering the card 15 freely tiltable in any direction.

Since the trainer in which the simulated compass is located is stationary, means are provided for rotataing the compass in response to simulated course changes of the trainer. These means form no part of the present invention but may comprise a self-synchronous system (not shown) in the lower portion of case 10 which is in driving connection with rotatable standard 13 which may have a single radially projecting arm 21 at its upper end engaged by a suitable vertical slot 22 in the cup-shaped member 19. By providing a relatively loose fit between arm 21 and slot 22 and by locating the arm in a horizontal plane through the contact point between pivot 18 and its bearing 17 it should be apparent that the card 15 will have unobstructed freedom of tilt in any direction while still being drivable through the rotation of standard 13. The compass card 15 is, of course, provided with the usual indicia 23 and a lubber's line quill 24 is centrally located in any suitable manner behind lens 12.

The novel means for tilting the compass card in response to simulated pitch and roll movements of the aircraft trainer comprises a vertical magnetized rod 25 attached in axial alignment with pivot 18 in any suitable manner as by a vertical holder 26 affixed to the top of card 15. Magnet 25 is of the permanent bar type whose upper end projects into a chamber 27 formed by a closed flanged cylindrical housing 28 similar in construction to the housing utilized on actual compasses for containing conventional magnetic compensators. The housing 28 is secured to the top of a chamber 11 in any suitable manner as by screws 29 and surrounding the exterior thereof is an annular core 30 having coils wrapped thereon as illustrated in the diagrammatic view of Fig. 2.

Core 30 contains two pairs of series-opposed coils whose electrical centers are 90° apart. Coils 31a and 31b are designated roll coils and a line drawn between their electrical centers is normal to the fore-and-aft axis of the trainer whereas a similar line between coils 32a and 32b, designated pitch coils, is parallel to the fore-and-aft axis of the aircraft.

Each of the respective sets of coils are energized in accordance with signals derived initially from the positioning of the trainer simulated flight controls. The manner in which such signals are produced is well known and forms no part of the present invention, it being sufficient to say that well-known analogue computers may produce signals causing rotation in one direction or the other of either or both a roll motor 32 or a pitch motor 33 which may be of the self-synchronous type whose respective shafts 34 and 35 move sliders 36 and 37 with respect to suitable center tapped potentiometer coils 38 and 39. Movement of sliders 36 and 37 away from the center tap determines the direction and degree of energization of the respective coil pairs 32a, 32b and 31a, 31b. The field produced by activating these coils moves the upper end of magnet 25 along the line of the resultant field and tilts the compass card 15 in response to the simulated pitch and roll of the aircraft. It should be understood that roll motor 32 could rotate in a direction opposite to that representing the actual bank of the aircraft or, if a simulated coordinated turn is properly executed bank motor 32 would not rotate at all even though the trainer might be in a simulated sharp bank. This effect is derived from a signal-producing computation made in a well-known manner in which the simulated force of gravity tending to move a body to the down wing side of the aircraft is offset by a simulated centrifugal force tending to move a body towards the up wing side. Since each of these forces may be a functon of flight control position, the resultant force may be electrically computed to produce a signal moving roll motor 32 an amount equal in direction and degree to said resultant force causing thereby a transverse tilting component of the compass card corresponding thereto.

As in actual aircraft magnetic compasses, the card 15 of the compass simulator described in connection with the present invention has only a limited degree of tilt before the card becomes caged on the top or bottom of the chamber 11. Thus a simulated near-vertical dive of the trainer, pitch motor 33 moves slider 37 to an extremity of potentiometer 39 thereby causing sufficient energization of coils 32a, 32b to move magnet 25 to its maximum extent in the fore-and-aft plane of the aircraft at which point the card 15 becomes caged precisely as in actual aircraft. A like effect is produced in roll coils 31a, 31b when the trainer is in a simulated deep roll position.

Though the present invention has been described in its application to the realistic tilting of a magnetic compass simulator for a non-flying flight trainer, it should be apparent that the invention is applicable to a plurality of other devices whose correct operation is either dependent upon their being self-leveling or upon their being tiltable in response to aircraft movement in pitch and roll. For example, one skilled in the art following the teaching of this invention would have no difficulty in adapting it for use with a simulated inclinometer or ball-bank indicator. Such uses are contemplated within the purview of the present invention, the foregoing being by way of example only and it should be apparent to those skilled in the art that the invention is succeptible to various uses and modifications without departing from the scope of the appended claims.

What is claimed is:

1. An instrument, such as a compass for a nonflying aircraft trainer, comprising a scale-carrying member having a single pivot support, means for rotating the member on said pivot support to simulate changes in the course of the trainer, and means for tilting the rotational axis of the member to simulate pitch and roll movements of the trainer, said tilting means comprising a bar magnet attached to the member with the axis of the magnet coinciding with the rotational axis of the member, a relatively stationary annular core of magnetic material encircling the extending end of the bar magnet, coils on said core, and means for regulating current flow through said coils to produce a variable magnetic flux field in the central aperture of the core, which field interacts with the field of the bar magnet to tilt the rotational axis of the carrying member.

2. An instrument, such as a compass for a nonflying aircraft trainer, comprising a scale-carrying member having a single pivot support, means for rotating the member on said pivot support to simulate changes in the course of the trainer, and means for tilting the rotational axis of the member to simulate pitch and roll movements of the trainer, said tilting means comprising a bar magnet attached to the member with the axis of the magnet coinciding with the rotational axis of the member, a relatively stationary annular core of magnetic material encircling the extending end of the bar magnet, four windings arranged about the core in equally spaced relationship, each diametrically disposed pair of windings being series opposed electrically interconnected, and means for regulating the current flow through the pairs of windings to produce a variable magnetic flux field in the central aperture of the core, which field interacts with the field of the bar magnet to tilt the rotational axis of the scale-carrying member.

3. An instrument, such as a compass for a non-flying aircraft trainer, comprising a scale-carrying member having a single pivot support, means for rotating the member on said pivot support to simulate changes in the course of the trainer, and means for tilting the rotational axis of the member to simulate pitch and roll movements of the trainer, said tilting means comprising a bar magnet attached to the member with the axis of the magnet coinciding with the rotational axis of the member, a relatively stationary annular core of magnetic material encircling the extending end of the bar magnet, four windings arranged about the core in equally spaced relationship, each diametrically disposed pair of windings being series opposed electrically interconnected, one pair of windings being located along the longitudinal axis of the trainer, and means for regulating the current flow through the pairs of windings to produce a variable magnetic flux field in the central aperture of the core which field interacts with the field of the bar magnet to tilt the rotational axis of the carrying member.

4. An instrument, such as a compass for a non-flying aircraft trainer, comprising a scale-carrying member having a single supporting pivot, a rotatable holder having a recess for receiving the pivot, an arm on the holder engaged in a slot in the scale-carrying member whereby rotation of the holder causes a corresponding rotation of the member to simulate changes in the course of the trainer, and means for tilting the rotational axis of the member to simulate pitch and roll movements of the trainer, said tilting means comprising a bar magnet attached to the member with the axis of the magnet coinciding with the rotational axis of the member, a relatively stationary annular core of magnetic material encircling the extending end of the bar magnet, and means including coils on said core for producing a variable magnetic flux field in the central aperture of the core, which field interacts with the field of the bar magnet to tilt the rotational axis of the scale-carrying member.

5. An instrument, such as a compass for a non-flying aircraft trainer, comprising a rotatable assembly including an inverted cup having a scale-carrying member attached thereto and a pivot having a point extending downwardly from the center of said cup, the center of gravity of the assembly being below the pivot point, a rotatable holder having a recess for receiving the pivot point, an arm extending radially from the holder with the projected arm axis passing through the pivot point, said cup having a longitudinally extending slot to receive the arm whereby rotation of the holder causes a corresponding rotation of the assembly to simulate changes in the course of the trainer without interfering with the tilting of the assembly, means for tilting the rotational axis of the assembly to simulate pitch and roll movements of the trainer, said tilting means comprising a bar magnet attached to the member with the axis of the magnet coinciding with the rotational axis of the member, a relatively stationary annular core of magnetic material encircling the extending end of the bar magnet, and means including coils on said core for producing a variable magnetic flux field in the central aperture of the core, which field interacts with the field of the bar magnet to tilt the rotational axis of the scale-carrying member.

References Cited in the file of this patent

UNITED STATES PATENTS

| | | |
|---|---|---|
| 1,880,523 | Tauschek | Oct. 4, 1932 |
| 2,229,069 | Geyger | Jan. 21, 1941 |
| 2,366,603 | Dehmel | Jan. 2, 1945 |
| 2,412,495 | Daly et al. | Dec. 10, 1946 |
| 2,417,229 | Alexanderson | Mar. 11, 1947 |
| 2,458,982 | Dehmel | Jan. 11, 1949 |
| 2,463,603 | Dehmel | Mar. 8, 1949 |
| 2,485,286 | Hayes | Oct. 18, 1949 |
| 2,522,434 | Dehmel | Sept. 12, 1950 |